(12) United States Patent
Chae et al.

(10) Patent No.: US 11,411,242 B2
(45) Date of Patent: Aug. 9, 2022

(54) LITHIUM SECONDARY BATTERY AND METHOD FOR PREPARING THE SAME

(71) Applicant: LG CHEM, LTD., Seoul (KR)

(72) Inventors: Oh Byong Chae, Daejeon (KR); Yoon Ah Kang, Daejeon (KR); Jun Hyuk Song, Daejeon (KR); Eun Kyung Kim, Daejeon (KR); Sang Wook Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/483,186

(22) PCT Filed: Jul. 6, 2018

(86) PCT No.: PCT/KR2018/007728
§ 371 (c)(1),
(2) Date: Aug. 2, 2019

(87) PCT Pub. No.: WO2019/013500
PCT Pub. Date: Jan. 17, 2019

(65) Prior Publication Data
US 2020/0235419 A1 Jul. 23, 2020

(30) Foreign Application Priority Data
Jul. 12, 2017 (KR) .................. 10-2017-0088556

(51) Int. Cl.
*H01M 10/052* (2010.01)
*H01M 4/04* (2006.01)
*H01M 4/38* (2006.01)
*H01M 10/44* (2006.01)

(52) U.S. Cl.
CPC ....... *H01M 10/052* (2013.01); *H01M 4/0447* (2013.01); *H01M 4/0452* (2013.01); *H01M 4/0459* (2013.01); *H01M 4/382* (2013.01); *H01M 10/446* (2013.01)

(58) Field of Classification Search
CPC . H01M 10/052; H01M 4/0452; H01M 4/0459
See application file for complete search history.

(56) References Cited

U.S. PATENT DOCUMENTS

| 10,193,135 | B2 | 1/2019 | Sharma et al. |
| 2006/0057433 | A1 | 3/2006 | Ando et al. |
| 2011/0041324 | A1 | 2/2011 | Ando et al. |
| 2012/0105007 | A1 | 5/2012 | Amiruddin et al. |
| 2012/0107680 | A1 | 5/2012 | Amiruddin et al. |
| 2013/0108914 | A1 | 5/2013 | Kasahara et al. |
| 2015/0333385 | A1 | 11/2015 | Sun et al. |
| 2016/0181594 | A1* | 6/2016 | Balogh ............... H01M 4/139 156/247 |
| 2016/0211507 | A1 | 7/2016 | Sharma et al. |
| 2018/0198118 | A1 | 7/2018 | Amiruddin et al. |

FOREIGN PATENT DOCUMENTS

| CN | 103190026 A | 7/2013 |
| CN | 104201320 A | 12/2014 |
| JP | 2012-199216 A | 10/2012 |
| JP | 2014-502006 A | 1/2014 |
| JP | 2015-88450 A | 5/2015 |
| KR | 10-2005-0116795 A | 12/2005 |
| KR | 10-2012-0092529 A | 8/2012 |
| KR | 10-2013-0108620 A | 10/2013 |
| KR | 10-2015-0089966 A | 8/2015 |
| KR | 10-2017-0111513 A | 10/2017 |
| TW | 201230465 A1 | 7/2012 |

OTHER PUBLICATIONS

Extended European Search Report dated Jan. 9, 2020, fo European Application No. 18832631.8.
International Search Report (PCT/ISA/210) issued in PCT/KR2018/007728, dated Feb. 15, 2019.

* cited by examiner

*Primary Examiner* — Ula C Ruddock
*Assistant Examiner* — Thomas H. Parsons
(74) *Attorney, Agent, or Firm* — Birch, Stewart, Kolasch & Birch, LLP (57) ABSTRACT

A lithium secondary battery including a positive electrode, a negative electrode, and a separator disposed between the positive electrode and the negative electrode, wherein the negative electrode is lithiated by pre-lithiation, a total capacity of a negative electrode active material of the negative electrode is larger than a total capacity of a positive electrode active material of the positive electrode, and a charge capacity of the negative electrode is smaller than a charge capacity of the positive electrode by the pre-lithiation.

9 Claims, 2 Drawing Sheets

LITHIUM SECONDARY BATTERY AND METHOD FOR PREPARING THE SAME

CROSS-REFERENCE TO RELATED APPLICATIONS

This application claims the benefit of Korean Patent Application No. 10-2017-0088556, filed on Jul. 12, 2017, in the Korean Intellectual Property Office, the disclosure of which is incorporated herein in its entirety by reference.

TECHNICAL FIELD

The present invention relates to a lithium secondary battery and a method of preparing the same, and more particularly, to a lithium secondary battery comprising a pre-lithiated negative electrode in which a charge capacity of the negative electrode is smaller than a charge capacity of a positive electrode due to the pre-lithiation, and a method of preparing the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted. Nickel-metal hydride (Ni-MH) secondary batteries have mainly been used as power sources of the electric vehicles (EVs) and hybrid electric vehicles (HEVs), but research into the use of lithium secondary batteries having high energy density, high discharge voltage, and output stability has been actively conducted, and some of the research has been commercialized.

A lithium secondary battery includes a structure in which an electrode assembly having a porous separator disposed between a positive electrode and a negative electrode, in which electrode collectors are respectively coated with active materials, is impregnated in a non-aqueous electrolyte comprising a lithium salt.

Charge and discharge of the lithium secondary battery is performed while a process of intercalating and deintercalating lithium ions from the positive electrode active material of the positive electrode into and out of the negative electrode active material of the negative electrode is repeated.

Theoretically, lithium intercalation and deintercalation reactions in the negative electrode active material are completely reversible, but, actually, more lithium is consumed than the theoretical capacity of the negative electrode active material, and only a portion of the lithium is recovered during discharge. Thus, after a second cycle, a smaller amount of lithium ions is intercalated during charge, but most of the intercalated lithium ions are deintercalated during discharge. Thus, a difference in capacity between the first charge and discharge reactions is referred to as an irreversible capacity loss, and, since a commercially available lithium secondary battery is prepared in a state in which lithium ions are supplied from the positive electrode and lithium is not present in the negative electrode, it is important to minimize the irreversible capacity loss during initial charge and discharge.

It is known that this initial irreversible capacity loss is mainly caused by an electrolyte decomposition reaction on a surface of the negative electrode active material, and an SEI (Solid Electrolyte Interface) is formed on the surface of the negative electrode active material by an electrochemical reaction due to the electrolyte decomposition. Since a large amount of lithium ions is consumed in the formation of the SEI, there is a limitation in that the irreversible capacity loss is caused, but the SEI formed at an initial stage of charging may prevent a reaction of the lithium ions with the negative electrode or other materials during charge and discharge and may act as an ion tunnel that only passes the lithium ions, and thus, the SEI contributes to the improvement of cycle characteristics of the lithium secondary battery by suppressing the further electrolyte decomposition reaction.

Therefore, there is a need for a method to improve the initial irreversibility caused by the formation of the SEI, and one of such methods comprises a method of allowing a side reaction generated during the first charge to occur in advance by performing pre-lithiation before the preparation of the lithium secondary battery. As described above, in a case in which the pre-lithiation is performed, when the actually prepared secondary battery is charged and discharged, since the first cycle is performed in a state in which the irreversibility is reduced accordingly, it is advantageous in that the initial irreversibility may be reduced.

In addition to the initial irreversibility, a reversible lithium ion source is reduced when the lithium secondary battery is repeatedly charged/discharged. The battery with degraded life characteristics may be recycled when supplementing the lithium source through a method of injecting an additional electrolyte solution, but it is inconvenient in that a process of making a passage for the further injection to the already completed cell and closing the passage again is necessary. Thus, a lithium secondary battery, which comprises a separate lithium electrode capable of separately supplementing lithium during the degradation of the battery, has been proposed. For example, Korean Patent Application Laid-open Publication No. 2005-0116795 discloses a secondary battery comprising an additional lithium electrode in addition to a positive electrode and a negative electrode. The document discloses the secondary battery in the form in which the additional lithium electrode is stacked and separated by a separator and at least one of the positive electrode and the negative electrode, and discloses a method in which a current collector of each electrode is exposed to the outside of the secondary battery through a terminal so that a lithium electrode terminal and at least one of the positive electrode terminal or the negative electrode terminal are connected to supply lithium ions to the positive electrode or the negative electrode during the degradation of the battery.

In terms of the fact that the process of making a passage for the further injection to the already completed cell and closing the passage again is not necessary, the method has an advantage of eliminating the inconvenience, but, since the separate lithium electrode is stacked with the positive electrode and the negative electrode to configure a cell, the method is disadvantageous in that an overall thickness of the cell is increased.

Therefore, there is a need to develop a lithium secondary battery capable of effectively addressing the degradation of life characteristics due to the reduction of the lithium source while addressing the initial irreversible capacity loss of the lithium secondary battery at the same time.

DISCLOSURE OF THE INVENTION

Technical Problem

An aspect of the present invention provides a lithium secondary battery in which cycle characteristics are improved by addressing the degradation of life characteristics due to the reduction of lithium source while addressing initial irreversible capacity loss of the lithium secondary battery at the same time.

Another aspect of the present invention provides a method of preparing the lithium secondary battery.

Technical Solution

According to an aspect of the present invention, there is provided a lithium secondary battery comprising: a positive electrode, a negative electrode, and a separator disposed between the positive electrode and the negative electrode, wherein the negative electrode is lithiated by pre-lithiation, a total capacity of a negative electrode active material of the negative electrode is larger than a total capacity of a positive electrode active material of the positive electrode, and a charge capacity of the negative electrode is smaller than a charge capacity of the positive electrode due to the pre-lithiation of the negative electrode.

According to another aspect of the present invention, there is provided a method of preparing the lithium secondary battery which comprises: (1) performing pre-lithiation of a negative electrode in an amount greater than an irreversible capacity of the negative electrode by supplying lithium ions to the negative electrode to prepare a pre-lithiated negative electrode; and (2) disposing a separator between the pre-lithiated negative electrode and a positive electrode, wherein a charge capacity of the negative electrode is smaller than a charge capacity of the positive electrode due to the pre-lithiation of the negative electrode.

Advantageous Effects

Since initial irreversible capacity is supplemented and a reduction in lithium source with an increase in cycle number is addressed at the same time, a lithium secondary battery according to the present invention may exhibit excellent cycle characteristics.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A lithium secondary battery according to the present invention comprises a positive electrode, a negative electrode, and a separator disposed between the positive electrode and the negative electrode, wherein the negative electrode is lithiated by pre-lithiation, a total capacity of a negative electrode active material of the negative electrode is larger than a total capacity of a positive electrode active material of the positive electrode, and a charge capacity of the negative electrode is smaller than a charge capacity of the positive electrode due to the pre-lithiation of the negative electrode.

Although the total capacity of the negative electrode active material of the negative electrode is larger than the total capacity of the positive electrode active material of the positive electrode, the charge capacity of the negative electrode is smaller than the charge capacity of the positive electrode due the pre-lithiation.

Specifically, the negative electrode is lithiated through the pre-lithiation process, and excessive pre-lithiation may be performed in which an amount of lithium, which is greater than an amount of lithium to supplement an irreversible capacity loss of the negative electrode, is supplied to the negative electrode. The excessive pre-lithiation denotes that the amount of lithium, which is equal to or greater than the amount of lithium required to supplement the irreversible capacity of the negative electrode, is supplied to the negative electrode, and lithium-ion storage sites of the negative electrode are occupied by lithium ions supplied by the pre-lithiation according to the excessive pre-lithiation. Accordingly, since the number of sites in the negative electrode, which are capable of accepting lithium ions supplied from the positive electrode, is reduced, the charge capacity of the entire negative electrode is reduced.

Lithium ions in an amount corresponding to a difference between the charge capacity of the positive electrode and the charge capacity of the negative electrode are not stored in the negative electrode during charge and electroplated on the negative electrode (Li-plating) to form a lithium plating layer, and thus, the negative electrode may comprise electroplated lithium (Li-plating).

The lithium electroplated on the negative electrode may continuously deposit and release lithium ions during charge and discharge of the lithium secondary battery, and thus, it may contribute as available capacity of the negative electrode. Also, the lithium electroplated on the negative electrode may function as an additional lithium source configured to supply lithium ions to the positive electrode or the negative electrode during the degradation of the lithium secondary battery. Accordingly, in the lithium secondary battery according to the embodiment of the present invention which comprises the negative electrode comprising the electroplated lithium, since the electroplated lithium may function as an additional supplementary lithium source, the lithium secondary battery may exhibit excellent cycle characteristics without supplying a separate lithium source due to the degradation of the battery.

The negative electrode may have a lithiated capacity of 26% to 90%, particularly 40% to 80%, and more particularly 50% to 75% based on a total capacity of the negative electrode active material due to the pre-lithiation. A degree of lithiation of the negative electrode may be expressed by a pre-lithiation degree (%) of the negative electrode, and the pre-lithiation degree of the negative electrode may be represented by pre-lithiation capacity of the negative electrode/total capacity of the negative electrode×100.

In a case in which the pre-lithiation degree of the negative electrode is within the above range, since the reduction of lithium ions due to the initial irreversible capacity loss of the negative electrode is effectively supplemented and the lithium remaining after the supplementation of the irreversible capacity is stored in the negative electrode to occupy the lithium storage sites of the negative electrode, an excessive reduction in the capacity of the negative electrode due to the excessive amount of the lithium electroplated on the negative electrode caused by an excessively large amount of the lithium supplied or a deterioration in safety of the battery above an appropriate level may be prevented while lithium ions moving from the positive electrode during subsequent charging of the lithium secondary battery may be allowed to be electroplated on the negative electrode.

The charge capacity of the negative electrode may be 10% or more to less than 100%, particularly 20% to 90%, and more particularly 30% to 80% of the charge capacity of the positive electrode. In a case in which the charge capacity of the negative electrode relative to the charge capacity of the positive electrode satisfies the above range, since the lithium may be electroplated on the negative electrode to an appropriate amount, the lithium may function as an additional lithium source to supplement lithium during the degradation of the lithium secondary battery and the deterioration in safety of the battery due to the excessive amount of the lithium electroplated on the negative electrode may be prevented.

In the specification of the present invention, the charge capacity of the negative electrode represents capacity of sites of the negative electrode in which lithium may be filled, in addition to the sites occupied by the lithium filled in the negative electrode through the pre-lithiation. Also, the charge capacity of the negative electrode and the charge capacity of the positive electrode represent values respectively corresponding to the charge capacity of the negative electrode and the charge capacity of the positive electrode when half-cells are configured by using each of the negative electrode and the positive electrode.

Hereinafter, a method of preparing the lithium secondary battery will be described.

The lithium secondary battery may be prepared by a method comprising: (1) performing pre-lithiation of a negative electrode in an amount greater than an irreversible capacity of the negative electrode by supplying lithium ions to the negative electrode to prepare a pre-lithiated negative electrode; and (2) disposing a separator between the pre-lithiated negative electrode and a positive electrode.

The negative electrode may be prepared by a typical method known in the art, and, for example, the negative electrode active material and additives, such as a binder and a conductive agent, are mixed and stirred to prepare a negative electrode active material slurry, and a negative electrode collector may then be coated with the slurry, dried, and pressed to prepare the negative electrode.

The method of preparing the lithium secondary battery according to the present invention performs pre-lithiation in an amount greater than the irreversible capacity of the negative electrode by supplying lithium ions to the prepared negative electrode.

The negative electrode may be lithiated by the pre-lithiation, and, specifically, the pre-lithiation may be excessive pre-lithiation in which the amount of lithium, which is greater than the amount of lithium to supplement the irreversible capacity loss of the negative electrode, is supplied to the negative electrode.

Since the lithium-ion storage sites of the negative electrode are occupied by the lithium ions supplied by the pre-lithiation according to the excessive pre-lithiation, the number of sites in the negative electrode, which are capable of accepting lithium ions supplied from the positive electrode, is reduced, and thus, the charge capacity of the entire negative electrode is reduced. Thus, according to the pre-lithiation, the charge capacity of the negative electrode may be allowed to be smaller than the charge capacity of the positive electrode.

The charge capacity of the negative electrode may be 10% or more to less than 100%, particularly 20% to 90%, and more particularly 30% to 80% of the charge capacity of the positive electrode.

That is, an amount of lithium corresponding to a capacity of 26% to 90%, particularly 40% to 80%, and more particularly 50% to 75% based on the total capacity of the negative electrode active material may be supplied through the pre-lithiation. The negative electrode may have a pre-lithiation degree of 26% to 70%, particularly 40% to 80%, and more particularly 50% to 75% through the pre-lithiation.

The pre-lithiation may be performed by a method of pressing lithium metal on a surface of the negative electrode, a method of depositing lithium metal on the surface of the negative electrode, or a method of coating the surface of the negative electrode with a dispersion of a binder polymer and particles containing an excessive amount of lithium metal, and may be specifically performed by a process that allows lithium metal to be in contact with the negative electrode and the negative electrode and the lithium metal to be closely attached to each other by pressure.

In an example of the process that allows lithium metal to be in contact with the negative electrode and the negative electrode and the lithium metal to be closely attached to each other by pressure, the pressure may be in a range of 0.1 kgf to 20 kgf, particularly 0.2 kgf to 10 kgf, and more particularly 0.5 kgf to 2 kgf per 1.5 cm$^2$ of the lithium metal. In a case in which the negative electrode and the lithium metal are in contact with each other within the above pressure range, deformation, for example, damage to a negative electrode active material layer due to excessive pressure or a change in porosity, may not occur while the lithium may be appropriately supplied to the negative electrode, particularly, the negative electrode active material layer. Time for which the lithium metal is in contact with the negative electrode may be 40 minutes to 3 hours, particularly 50 minutes to 2 hours, and more particularly 50 minutes to 90 minutes. In a case in which the contact time is within the above range, the lithium may be sufficiently supplied to the negative electrode active material layer, and, in a case in which the contact time is insufficient, the pre-lithiation may not be sufficiently performed.

When the pre-lithiation of the negative electrode is performed as described above, an electrode assembly is prepared by disposing a separator between the pre-lithiated negative electrode and a positive electrode.

The positive electrode may be prepared by a typical method known in the art. For example, a binder, a conductive agent, and a dispersant, if necessary, as well as a solvent are mixed with a positive electrode active material and stirred to prepare a slurry, a metal current collector is then coated with the slurry and pressed, and the positive electrode may then be prepared by drying the coated metal current collector.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

After the electrode assembly is put in a battery case, a lithium secondary battery may be prepared by injecting an electrolyte solution.

The method of preparing the lithium secondary battery according to an embodiment of the present invention may comprise a process of Li-plating on the negative electrode by charging the prepared lithium secondary battery. During the charging process, lithium ions in the amount corresponding to the difference between the charge capacity of the positive electrode and the charge capacity of the negative electrode are not stored in the negative electrode during charge and electroplated on the negative electrode (Li-plating) to form a lithium plating layer, and thus, the negative electrode may be subjected to Li-plating.

As the negative electrode active material, amorphous carbon or crystalline carbon may be included, and, specifically, carbon such as non-graphitizable carbon and graphite-based carbon; a complex metal oxide such as $Li_uFe_2O_3$ ($0 \le u \le 1$), $Li_vWO_2$ ($0 \le v \le 1$), $Sn_xMe_{1-z}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0 < x \le 1$; $1 \le y \le 3$; $1 \le z \le 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material may be used.

The binder may be used for maintaining a molded article by binding negative electrode active material particles, wherein the binder is not particularly limited as long as it is a typical binder used in the preparation of the slurry for a negative electrode active material, but, for example, a non-aqueous binder, such as polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene, or polypropylene, may be used, and at least one selected from the group consisting of an acrylonitrile-butadiene rubber, a styrene-butadiene rubber, and an acrylic rubber, which are aqueous binders, or a mixture of two or more thereof may be used. Since the aqueous binder, different from the non-aqueous binder, may be economical and environmentally friendly, may not be harmful to the health of workers, and may have a better binding effect than the non-aqueous binder, a ratio of the active material for the same volume may be increased. Thus, capacity of the lithium secondary battery may be increased, and the styrene-butadiene rubber may be preferably used as the aqueous binder.

The binder may be included in an amount of 10 wt % or less, for example, 0.1 wt % to 10 wt %, based on a total weight of the slurry for a negative electrode active material. When the amount of the binder is less than 0.1 wt %, it is not desirable because an effect obtained by using the binder is insignificant, and, when the amount of the binder is greater than 10 wt %, it is not desirable because capacity per volume may be reduced due to a relative decrease in the amount of the active material caused by the increase in the amount of the binder.

Any conductive agent may be used without particular limitation so long as it has conductivity without causing adverse chemical changes in the battery, and, examples of the conductive agent may be a conductive material such as: graphite such as natural graphite or artificial graphite; a carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

A negative electrode collector used in the negative electrode according to an embodiment of the present invention may have a thickness of 3 μm to 500 μm. The negative electrode collector is not particularly limited as long as it has conductivity without causing adverse chemical changes in the battery, and, for example, copper, gold, stainless steel, aluminum, nickel, titanium, fired carbon, copper or stainless steel that is surface-treated with one of carbon, nickel, titanium, silver, or the like, and an aluminum-cadmium alloy may be used. Also, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

Any thickener typically used in a lithium secondary battery may be used as a thickener, and an example of the thickener may be carboxymethyl cellulose (CMC).

In the positive electrode, the metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

In the method of preparing a lithium secondary battery of the present invention, examples of the positive electrode active material may be lithium cobalt oxide ($LiCoO_2$); lithium nickel oxide ($LiNiO_2$); $Li[Ni_aCo_bMn_cM^1_d]O_2$ (where $M^1$ is at least one element selected from the group consisting of aluminum (Al), gallium (Ga), and indium (In), $0.3 \le a < 1.0$, $0 \le b \le 0.5$, $0 \le c \le 0.5$, $0 \le d \le 0.1$, and $a+b+c+d=1$); a layered compound, such as $Li(Li_eM^2_{f-e-f'}M^3_{f'})O_{2-g}A_g$ (where $0 \le e \le 0.2$, $0.6 \le f \le 1$, $0 \le f' \le 0.2$, $0 \le g \le 0.2$, $M^2$ comprises manganese (Mn) and at least one selected from the group consisting of nickel (Ni), cobalt (Co), iron (Fe), chromium (Cr), vanadium (V), copper (Cu), zinc (Zn), and titanium (Ti), $M^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as $Li_{1+h}Mn_{2-h}O_4$ (where $0 \leq h \leq 0.33$), $LiMnO_3$, $LiMn_2O_3$, and $LiMnO_2$; lithium copper oxide ($Li_2CuO_2$); vanadium oxides such as $LiV_3O_8$, $V_2O_5$, and $Cu_2V_2O_7$; Ni-site type lithium nickel oxide represented by the chemical formula $LiNi_{1-i}M^4_iO_2$ (where $M^4$=Co, Mn, Al, Cu, Fe, Mg, B, or Ga, and $0.01 \leq i \leq 0.3$); lithium manganese composite oxide represented by the chemical formula $LiMn_{2-j}M^5_jO_2$ (where $M^5$=Co, Ni, Fe, Cr, Zn, or tantalum (Ta), and $0.01 \leq j \leq 0.1$) or $Li_2Mn_3M^6O_8$ (where $M^6$=Fe, Co, Ni, Cu, or Zn); $LiMn_2O_4$ having a part of Li being substituted with alkaline earth metal ions; a disulfide compound; $LiFe_3O_4$, or $Fe_2(MoO_4)_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HFP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, Na, or Ca, or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

An aqueous dispersant or an organic dispersant, such as N-methyl-2-pyrrolidone, may be used as the dispersant.

A lithium salt, which may be included as the electrolyte, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2 N^-$ may be used as an anion of the lithium salt.

The electrolyte used in the present invention may comprise an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery, but the present invention is not limited thereto.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module comprising a plurality of battery cells.

EXAMPLES

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1

<Preparation of Negative Electrode>

A negative electrode mixture slurry was prepared by adding 92 wt % of a mixture of graphite and SiO (graphite:SiO=7:3), as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

<Pre-lithiation using Direct Contact Method>

The above-prepared negative electrode was wetted for 5 hours by being immersed in an electrolyte solution in which 1 M $LiPF_6$ was dissolved in a solvent that was prepared by mixing ethylene carbonate (EC) and diethyl carbonate (DEC) in a volume ratio of 50:50, and lithium metal was then pressed against the electrode for 60 minutes at a force of 1 kgf per 1.5 $cm^2$. The electrode thus directly contacted was washed with dimethyl carbonate (DMC) and dried.

<Preparation of Half Cell>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Example 2

<Pre-Lithiation Using Direct Contact Method>

The negative electrode prepared in Example 1 was wetted for 5 hours by being immersed in an electrolyte solution in which 1 M $LiPF_6$ was dissolved in a solvent that was prepared by mixing ethylene carbonate (EC) and diethyl carbonate (DEC) in a volume ratio of 50:50, and lithium metal was then pressed against the electrode for 90 minutes at a force of 1 kgf per 1.5 cm². The electrode thus directly contacted was washed with dimethyl carbonate (DMC) and dried.

<Preparation of Half Cell>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Example 3

<Preparation of Positive Electrode>

96 wt % of $LiNi_{0.6}Co_{0.2}Mn_{0.2}O_2$ as a positive electrode active material, 1.5 wt % of Denka black (conductive agent), and 2.5 wt % of PVdF (polyvinylidene fluoride, binder) were added to NMP (N-methyl-2-pyrrolidone) to prepare a positive electrode mixture slurry. After one surface of an aluminum current collector was coated with the prepared positive electrode mixture slurry, dried, rolled, the coated aluminum current collector was punched into a predetermined size to prepare a positive electrode.

<Preparation of Lithium Secondary Battery>

A polyolefin separator was disposed between the negative electrode prepared in Example 1 and the above-prepared positive electrode, and a lithium secondary battery was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Example 4

<Preparation of Lithium Secondary Battery>

A lithium secondary battery was prepared in the same manner as in Example 3 except that the negative electrode prepared in Example 2 was used as a negative electrode.

Comparative Example 1

<Preparation of Negative Electrode>

A negative electrode mixture slurry was prepared by adding 92 wt % of a mixture of graphite and SiO (graphite: SiO=7:3), as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

<Preparation of Half Cell>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Comparative Example 2

<Preparation of Negative Electrode>

A negative electrode mixture slurry was prepared by adding 92 wt % of a mixture of graphite and SiO (graphite: SiO=7:3), as a negative electrode active material, 3 wt % of Denka black (conductive agent), 3.5 wt % of SBR (binder), and 1.5 wt % of CMC (thickener) to water. After one surface of a copper current collector was coated with the prepared negative electrode mixture slurry, dried, and rolled, the coated copper current collector was punched into a predetermined size to prepare a negative electrode having a negative electrode active material layer formed thereon.

<Pre-lithiation using Direct Contact Method>

The above-prepared negative electrode was wetted for 5 hours by being immersed in an electrolyte solution in which 1 M $LiPF_6$ was dissolved in a solvent that was prepared by mixing ethylene carbonate (EC) and diethyl carbonate (DEC) in a volume ratio of 50:50, and lithium metal was then pressed against the electrode for 30 minutes at a force of 1 kgf per 1.5 cm². The electrode thus directly contacted was washed with dimethyl carbonate (DMC) and dried.

<Preparation of Half Cell>

A Li metal foil (150 μm) was used as a counter electrode, a polyolefin separator was disposed between the negative electrode and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Comparative Example 3

<Preparation of Lithium Secondary Battery>

A polyolefin separator was disposed between the negative electrode prepared in Comparative Example 1 and the positive electrode prepared in Example 3, and a lithium secondary battery was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Comparative Example 4

A lithium secondary battery was prepared in the same manner as in Comparative Example 3 except that the negative electrode prepared in Comparative Example 2 was used as a negative electrode.

Experimental Example 1: First Cycle Charge/Discharge Test

<Negative Electrode Half Cell>

Charge/discharge reversibility test was performed on the coin-type half cells prepared in Examples 1 and 2 and Comparative Examples 1 and 2 using an electrochemical charger/discharger. The coin-type half cells were charged by applying a current at a current density of 0.1 C-rate to a voltage of 0.005 V (vs. $Li/Li^+$) during first cycle charge and discharged at the same current density to a voltage of 1.5 V (vs. $Li/Li^+$) during discharge. In this case, charge capacity and discharge capacity were measured, and the results thereof are presented in FIGS. 1 to 3.

<Positive Electrode Half Cell>

A Li metal foil (150 μm) was used as a counter electrode, a polyolefin separator was disposed between the positive electrode prepared in Example 3 and the Li metal, and a coin-type half cell was then prepared by injecting an electrolyte in which 1 M $LiPF_6$ was dissolved in a solvent that was prepared by mixing ethylene carbonate (EC) and diethyl carbonate (DEC) in a volume ratio of 50:50.

Charge/discharge reversibility test was performed on the above-prepared coin-type half cell using an electrochemical charger/discharger. The coin-type half cell was charged by applying a current at a current density of 0.1 C-rate to a voltage of 4.25 V (vs. Li/Li$^+$) during first cycle charge and discharged at the same current density to a voltage of 3.0 V (vs. Li/Li$^+$) during discharge. In this case, charge capacity and discharge capacity were measured, and the results thereof are presented in FIGS. 1 to 3.

Figure 1:
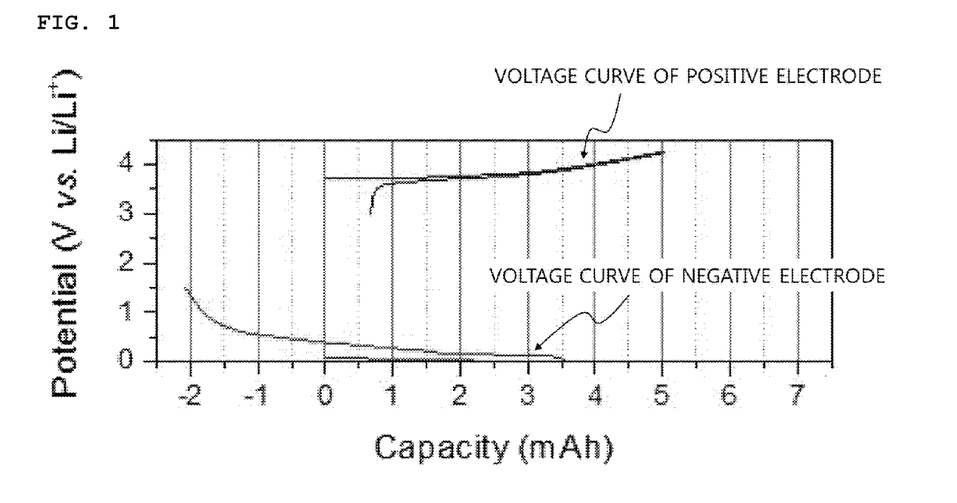
FIG. 1 is a graph illustrating a positive electrode voltage curve and a negative electrode voltage curve of a lithium secondary battery according to Example 1.

Referring to FIG. 1, it may be confirmed that the capacity of the negative electrode of the coin-type half cell prepared in Example 1 was smaller than the capacity of the positive electrode of the above-prepared positive electrode half cell. Thus, in a case in which the negative electrode was pre-lithiated, it may be confirmed that the capacity of the negative electrode is smaller than the capacity of the positive electrode.

Figure 2:
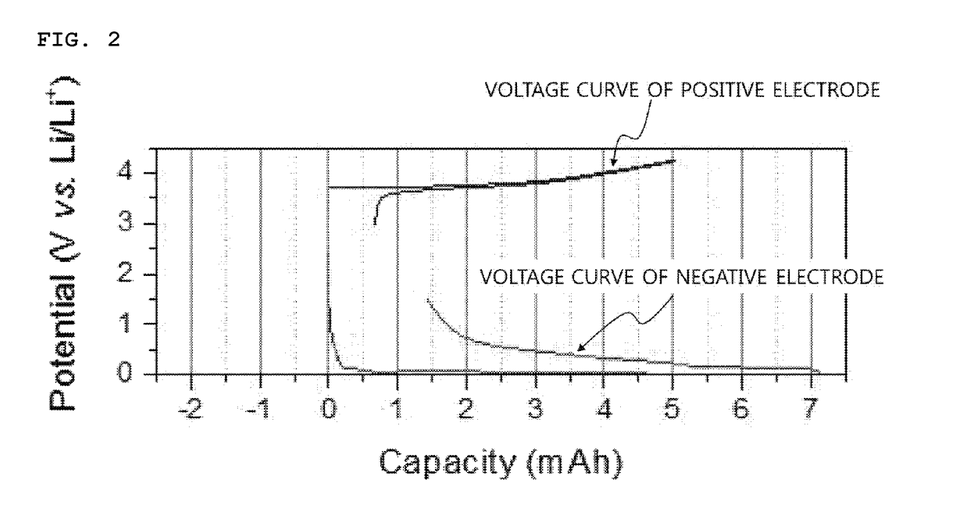
FIG. 2 is a graph illustrating a positive electrode voltage curve and a negative electrode voltage curve of a lithium secondary battery according to Comparative Example 1.

Also, referring to FIG. 2, the capacity of the negative electrode of the coin-type half cell prepared in Comparative Example 1 was larger than the capacity of the positive electrode of the above-prepared positive electrode half cell, and thus, it may be confirmed that the capacity of the negative electrode was reduced in comparison to the capacity of the positive electrode through the pre-lithiation.

Figure 3:
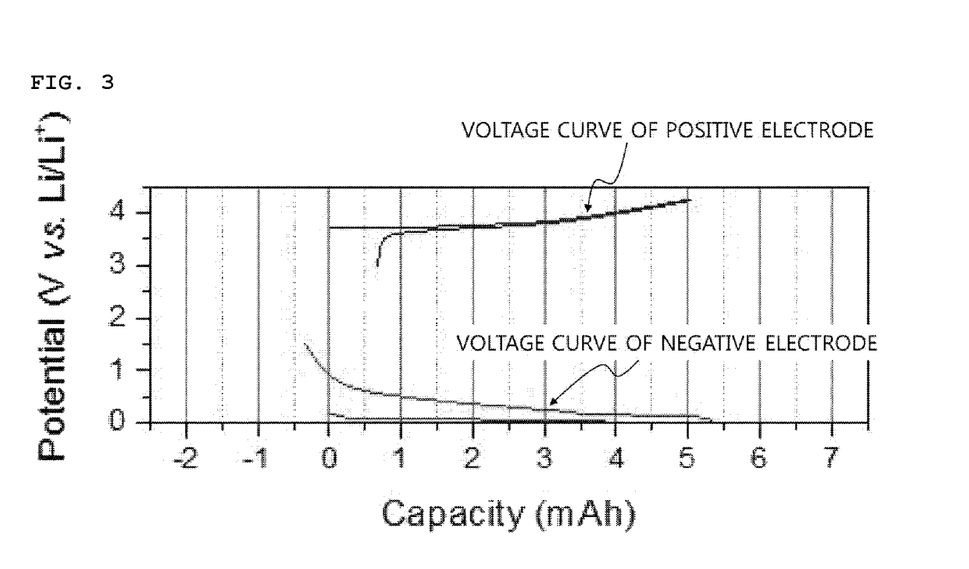
FIG. 3 is a graph illustrating a positive electrode voltage curve and a negative electrode voltage curve of a lithium secondary battery according to Comparative Example 2.

Referring to FIG. 3, the capacity of the negative electrode of the coin-type half cell prepared in Comparative Example 2 was larger than the capacity of the positive electrode of the above-prepared positive electrode half cell even though the negative electrode was pre-lithiated, wherein, accordingly, it may be confirmed that a degree of pre-lithiation may be controlled by adjusting the contact time between the negative electrode and the lithium metal during the pre-lithiation.

Experimental Example 2: Charge/Discharge Test

Charge/discharge reversibility test was performed on the lithium secondary batteries prepared in Examples 3 and 4 and Comparative Examples 3 and 4 using an electrochemical charger/discharger. The lithium secondary batteries were charged by applying a current at a current density of 0.1 C-rate to a voltage of 4.2 V (vs. Li/Li$^+$) during first cycle charge and discharged at the same current density to a voltage of 2.5 V (vs. Li/Li$^+$) during discharge. In this case, charge capacity and discharge capacity were measured, and the results thereof are presented in Table 1. Also, the charge and discharge were repeated up to 100 cycles to measure charge capacity and discharge capacity in this case, and the results thereof are then presented in Table 1.

electrode in the first cycle (%)=charge capacity of the negative electrode/charge capacity of the positive electrode× 100. Referring to Table 1, the negative electrode of the lithium secondary battery of Example 3 had a pre-lithiation degree of 50%, and, since the charge capacity of the negative electrode was reduced in comparison to the charge capacity of the positive electrode, the charge capacity ratio of the negative electrode to the positive electrode in the first cycle was 72%. The lithium secondary battery of Comparative Example 3, in which the pre-lithiation of the negative electrode was not performed, had a charge capacity ratio of the negative electrode to the positive electrode in the first cycle of 142%, and the lithium secondary battery of Comparative Example 4 had a pre-lithiation degree of 25% and a charge capacity ratio of the negative electrode to the positive electrode in the first cycle of 106%.

When examining the first cycle reversible capacity, with respect to the lithium secondary battery of Comparative Example 3 in which the pre-lithiation was not performed, since irreversible capacity was not supplemented, the lithium secondary battery of Comparative Example 3 exhibited a smaller reversible capacity than the lithium secondary battery of Example 2 and the lithium secondary battery of Comparative Example 4 in which the pre-lithiation was performed. Also, when examining the 100$^{th}$ cycle reversible capacity, the lithium secondary battery of Comparative Example 3, in which the pre-lithiation was not performed, exhibited the smallest value, wherein, it was analyzed that, since the lithium secondary battery of Comparative Example 3 was not lithiated, it was discharged to the discharge end of the negative electrode, and thus, the shrinkage of SiO was increased to accelerate cycle degradation. With respect to Comparative Example 4, since the pre-lithiation was performed, a reduction width of the reversible capacity was smaller than that of Comparative Example 3. With respect to the lithium secondary battery of Example 3, since a reduction width of the reversible capacity was small even after the 100th cycle, it exhibited a high capacity retention, wherein the reason for this is considered that Li-plating on the negative electrode occurred after the charge of graphite and SiO was completed due to smaller capacity of the negative electrode than the positive electrode, the electroplated lithium first discharged before lithium, which was stored in the form of ions in the negative electrode active material of the negative electrode, during discharge and participated in the reaction to help not to consume all of the lithium ions

TABLE 1

|  | Example 3 | Example 4 | Comparative Example 3 | Comparative Example 4 |
|---|---|---|---|---|
| Pre-lithiation degree of negative electrode (%) | 50 | 75 | 0 | 25 |
| Charge capacity ratio of negative electrode to positive electrode in the first cycle (%) | 72 | 30 | 142 | 106 |
| First cycle reversible capacity (mAh) | 4.2 | 4.2 | 3.8 | 4.3 |
| 100$^{th}$ cycle reversible capacity (mAh) | 4.0 | 3.9 | 2.6 | 3.6 |

In Table 1, the pre-lithiation degree (%) of the negative electrode=pre-lithiation capacity of the negative electrode/ capacity of the negative electrode×100, and the charge capacity ratio of the negative electrode to the positive stored in the negative electrode active material, and cycle degradation was suppressed because there was a lot of extra lithium ions in the SiO or graphite even if the electroplated lithium was all consumed during the cycle degradation.

The invention claimed is:

1. A lithium secondary battery comprising:
a positive electrode, a negative electrode, and a separator disposed between the positive electrode and the negative electrode,
wherein the negative electrode is lithiated by pre-lithiation,
wherein the pre-lithiation is performed by a process that allows lithium metal to be in contact with the negative electrode and the negative electrode and the lithium metal to be attached to each other by pressure in the range of 0.1 kgf per 1.5 cm$^2$ to 20 kgf per 1.5 cm$^2$,
a total capacity of a negative electrode active material of the negative electrode is larger than a total capacity of a positive electrode active material of the positive electrode, and
a charge capacity of the negative electrode is smaller than a charge capacity of the positive electrode due to the pre-lithiation of the negative electrode,
wherein the negative electrode comprises electroplated lithium, and
wherein the negative electrode has a lithiated capacity of 50% to 75% based on the total capacity of the negative electrode active material due to the pre-lithiation.

2. The lithium secondary battery of claim 1, wherein lithium ions in an amount corresponding to a difference between the charge capacity of the positive electrode and the charge capacity of the negative electrode are electroplated to form the electroplated lithium.

3. The lithium secondary battery of claim 1, wherein the electroplated lithium is configured to supply lithium ions to the positive electrode or the negative electrode during degradation of the lithium secondary battery.

4. The lithium secondary battery of claim 1, wherein the charge capacity of the negative electrode is 10% or more to less than 100% of the charge capacity of the positive electrode.

5. A method of preparing the lithium secondary battery of claim 1, the method comprising:
(1) performing pre-lithiation of a negative electrode in an amount greater than an irreversible capacity of the negative electrode by supplying lithium ions to the negative electrode to prepare a pre-lithiated negative electrode; and
(2) disposing a separator between the pre-lithiated negative electrode and a positive electrode,
wherein a charge capacity of the negative electrode is smaller than a charge capacity of the positive electrode due to the pre-lithiation of the negative electrode, and
wherein an amount of lithium corresponding to a capacity of 50% to 75% based on the total capacity of a negative electrode active material supplied through the pre-lithiation.

6. The method of claim 5, wherein the pre-lithiation is performed such that an amount of lithium, which is greater than an amount of lithium to supplement an irreversible capacity loss of the negative electrode, is supplied to the negative electrode.

7. The method of claim 5, wherein the charge capacity of the negative electrode is 10% or more to less than 100% of the charge capacity of the positive electrode.

8. The method of claim 5, wherein a time for which lithium metal is in contact with the negative electrode during pre-lithiation is 40 minutes to 3 hours.

9. The method of claim 5, further comprising performing lithium plating on the negative electrode by charging the lithium secondary battery.

* * * * *